United States Patent [19]

Rasmussen

[11] Patent Number: 4,610,377
[45] Date of Patent: Sep. 9, 1986

[54] FLUID DISPENSING SYSTEM

[75] Inventor: Robert Rasmussen, Minneapolis, Minn.

[73] Assignee: Progressive Assembly Machine Co., Inc., Plymouth, Minn.

[21] Appl. No.: 532,503

[22] Filed: Sep. 14, 1983

[51] Int. Cl.$^4$ .................. G01F 11/06; G01F 11/30; G01F 11/36

[52] U.S. Cl. .................. 222/288; 222/309; 222/334; 222/380; 417/403; 417/454

[58] Field of Search .............. 222/333, 334, 309, 288, 222/372, 373, 380; 417/360, 451, 454, 510

[56] References Cited

U.S. PATENT DOCUMENTS

| | | | |
|---|---|---|---|
| 2,308,974 | 1/1943 | Harper | 417/510 |
| 2,905,361 | 9/1959 | Noall | |
| 3,162,336 | 12/1964 | Erickson | |
| 3,227,325 | 1/1966 | Bates | 222/334 X |
| 3,341,076 | 9/1967 | Wasilewski et al. | |
| 3,785,526 | 1/1974 | Shinn | |
| 4,055,281 | 10/1977 | Rosen et al. | 222/334 X |
| 4,273,261 | 6/1981 | Krueger | 222/288 X |
| 4,477,232 | 10/1984 | Mayer | 417/360 X |

Primary Examiner—Joseph J. Rolla
Assistant Examiner—P. McCoy Smith
Attorney, Agent, or Firm—Dorsey & Whitney

[57] ABSTRACT

An electronically controlled, pneumatically actuated pumping system is provided that is especially designed for the precision dispensing of liquids. The system includes a positively actuated inlet valve, and a small-diameter, long-stroke pumping piston that is physically stopped at each end of its stroke. The unique inlet valve and piston enable the system to repetitively dispense metered volumes of fluid at better than one tenth of one percent accuracy. A unique calibration mechanism and detachable dispensing head allow for the rapid disassembly, cleaning, and reassembly of the system. An alternative embodiment of the pumping system incorporates a plurality of dispensing nozzles controlled by a single inlet valve and pumping piston combination. The dispensing unit may be shiftably mounted on a vertically oriented stand, and may be automatically shifted upwardly as fluid is dispensed to minimize splashing and atomizing of the dispensed fluid.

4 Claims, 8 Drawing Figures

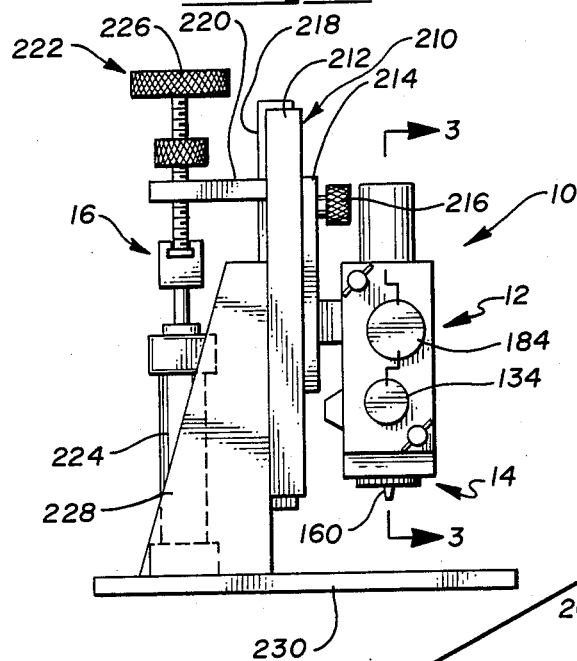
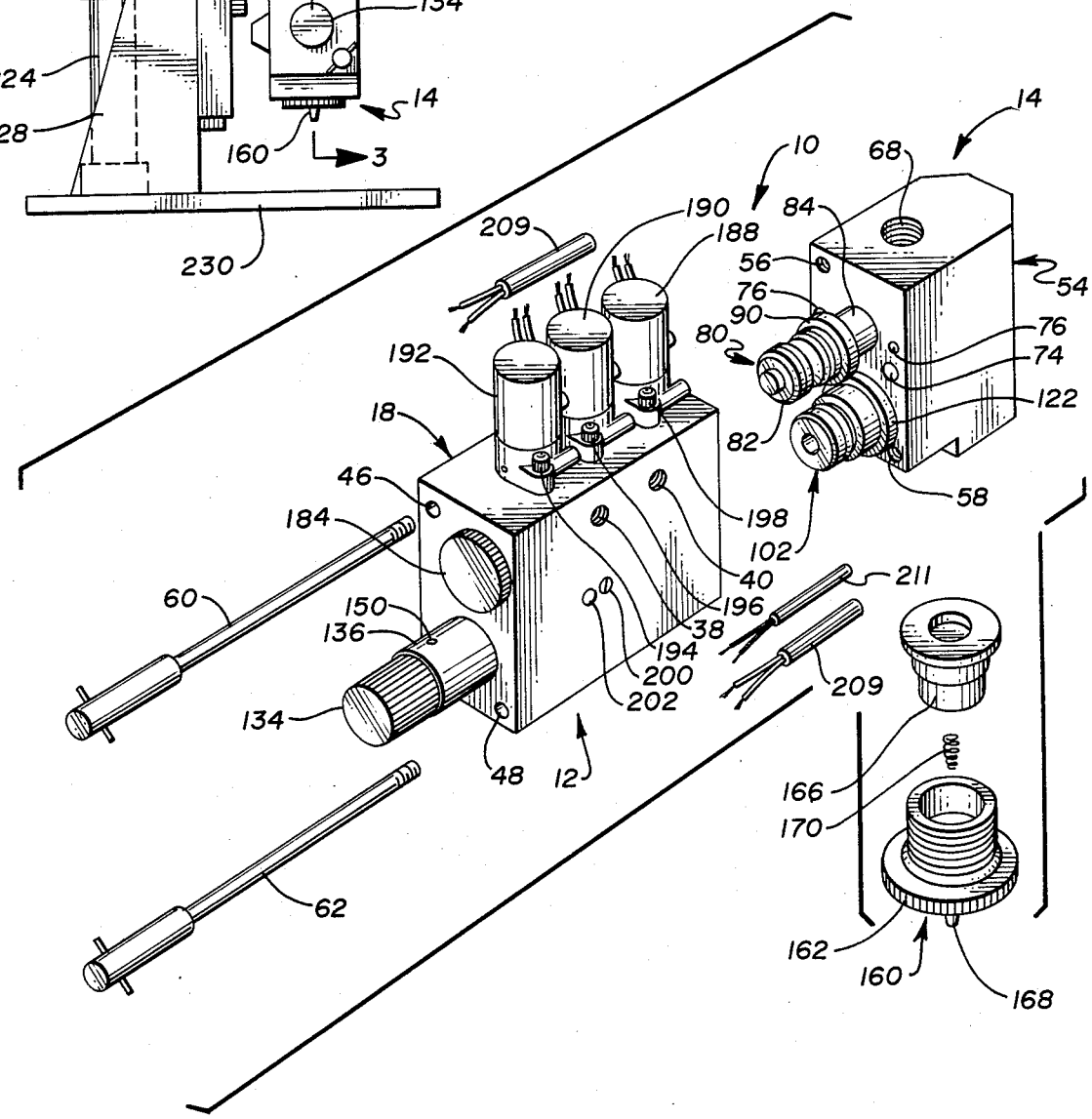

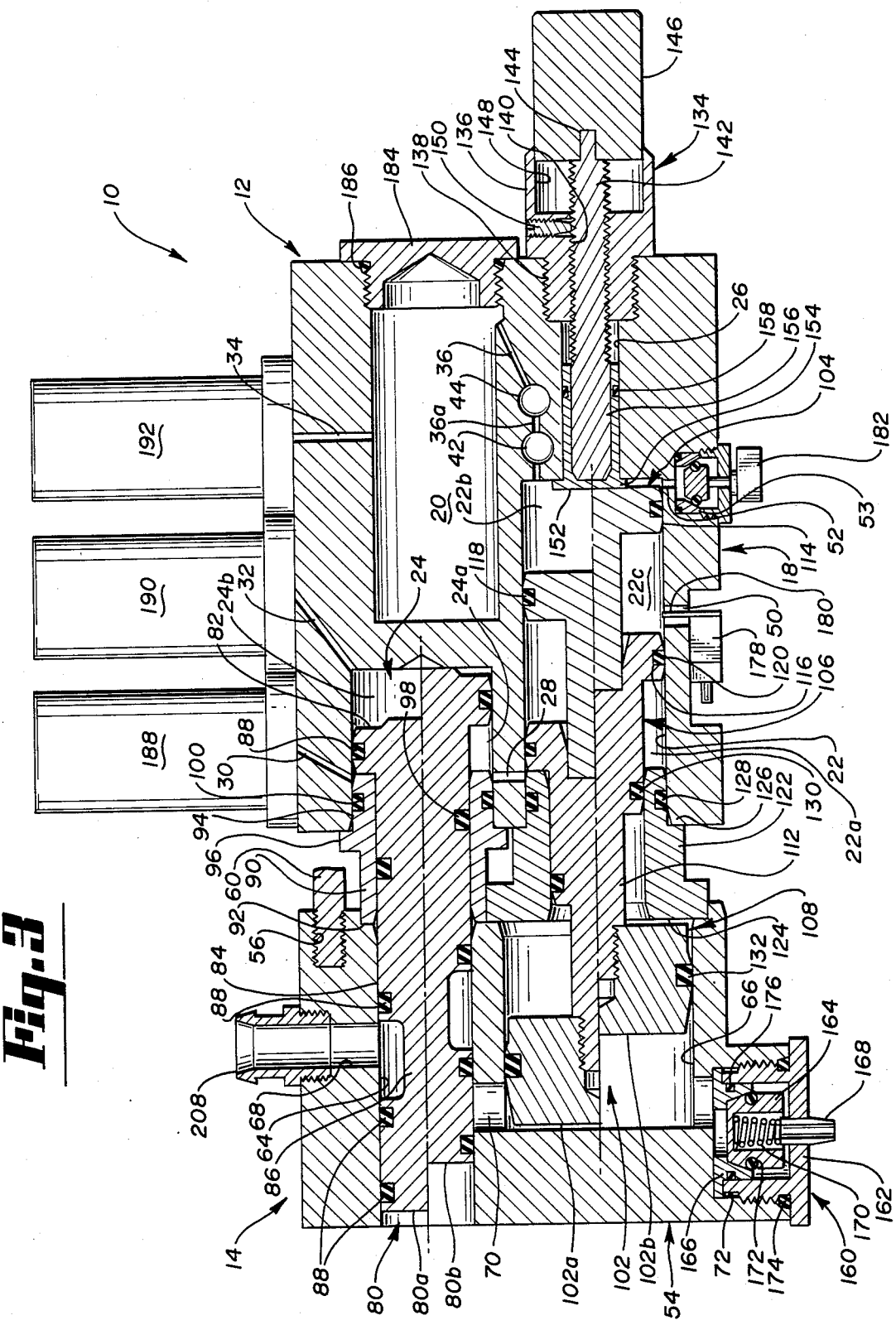

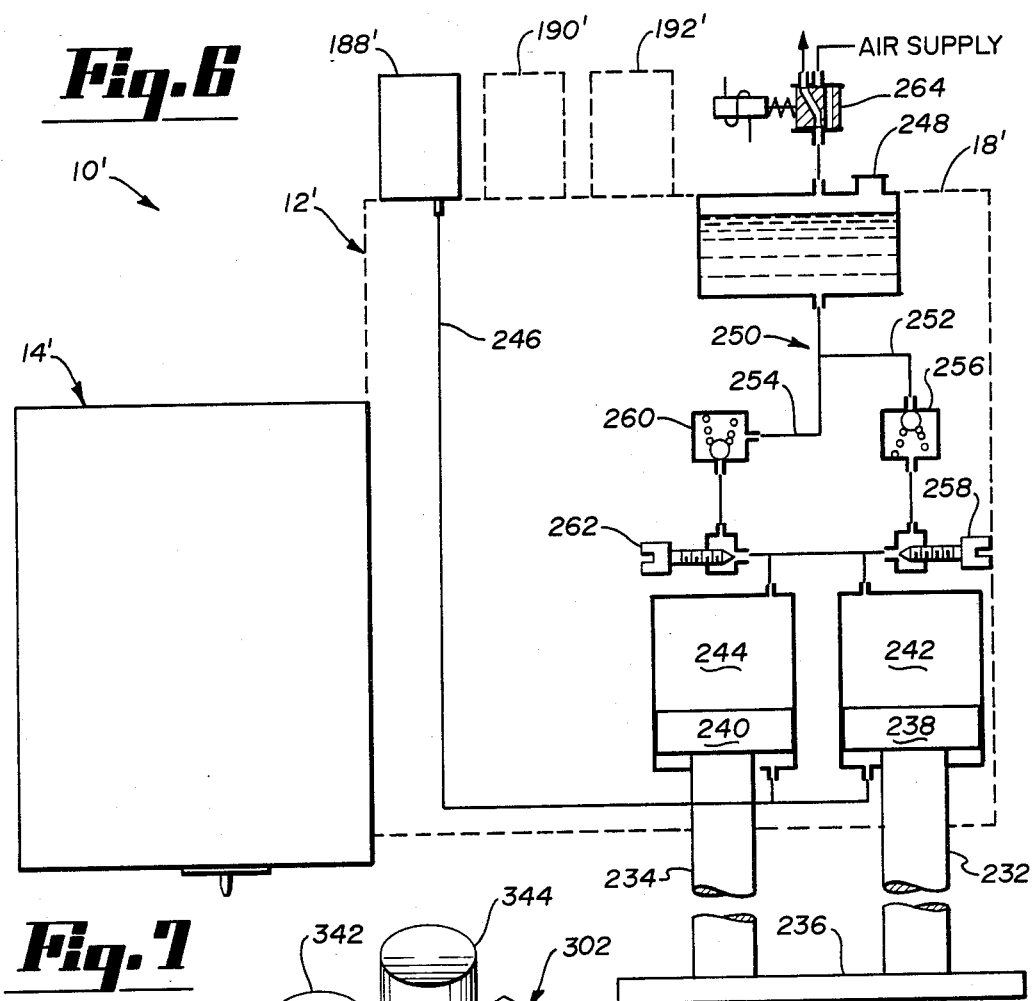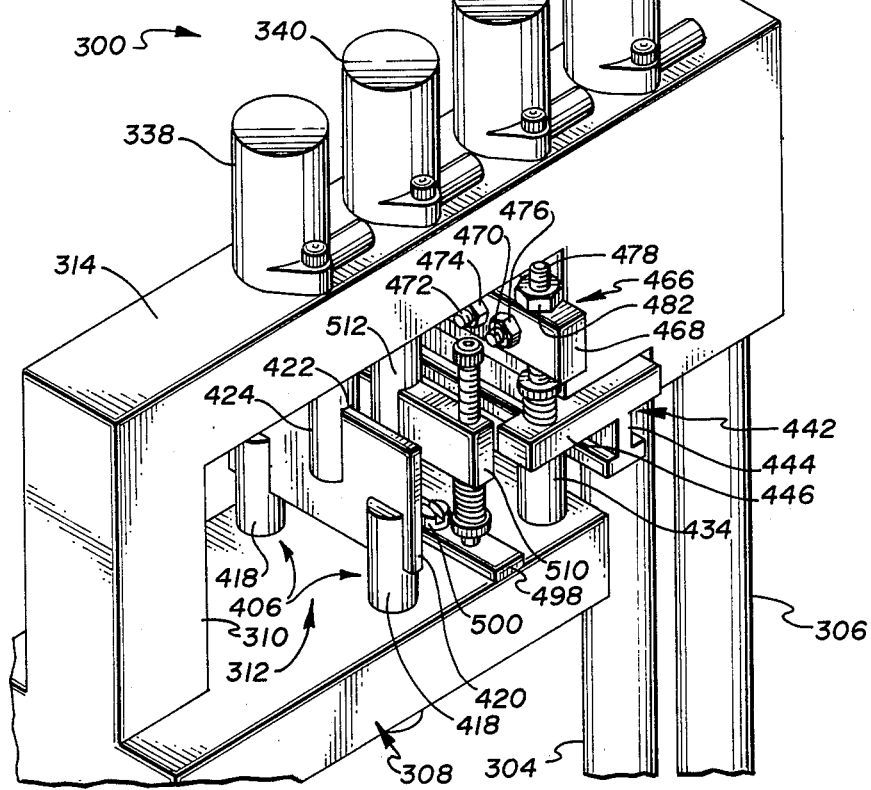

FLUID DISPENSING SYSTEM

FIELD OF THE INVENTION

This invention pertains to automatic liquid dispensing pump systems. More particularly, it pertains to an electronically controlled, pneumatically actuated pump system for dispensing metered volumes of liquid to within one-tenth of one percent accuracy.

BACKGROUND ART

Numerous industries require the repetitive, precision dispensing of liquid in carefully metered volumes. Heretofore, the systems for the precision dispensing of fluids have been labor intensive, requiring continuous monitoring by skilled personnel. Moreover, previous systems have been difficult to calibrate, and require a complete calibration process each time the system is disassembled for cleaning.

Fluids that must be dispensed in carefully metered volumes are often comprised of delicate molecular structures. Such liquids can be damaged by conventional dispensing systems that employ "squeezing" action to regulate the volume of liquid dispensed. Moreover, the splashing, or atomizing of the fluid as it is dispensed can damage the fluids, and affect the accuracy of the dispensed volume.

An automatic liquid dispensing pump system that could repetitively dispense metered volumes of liquid, that could easily be disassembled for cleaning, reassembled, and rapidly calibrated, and which would neither squeeze or splash the liquid as it was dispensed would be a decided advantage.

SUMMARY OF THE INVENTION

The problems outlined above are in large measure solved by the automatic liquid dispensing pump system in accordance with the present invention. That is to say, the dispensing pump system hereof is designed to repetitively dispense metered volumes of fluid to within one-tenth of one percent accuracy can be quickly calibrated, is easily disassembled for cleaning without need for recalibration, and is capable of dispensing fluid without splashing or squeezing the dispensed fluid.

The liquid dispensing system in accordance with the present invention includes an air manifold and detachable pump head. The pump head broadly includes a positively actuated, spool type inlet valve, a small-diameter, long stroke, pumping piston, a dispensing nozzle, and a fluid inlet channel. The manifold broadly includes the actuating mechanisms for the pump inlet valve and pump piston, an interchangeable calibration mechanism, a hydraulic fluid reservoir and associated conduits for directing pressurized hydraulic fluid within the manifold, and a control system comprising a pair of piston-stroke limiting switches and a plurality of pneumatic, single pole, double throw switches. A pair of threaded connection rods releasably secure the pump head to the manifold. The assembled pump may be shiftably mounted on a vertically oriented support stand.

BRIEF DESCRIPTION OF THE DRAWINGS

FIG. 1 is an elevational view of a fluid dispensing system in accordance with the present invention mounted on a vertical support stand;

FIG. 2 is an exploded, perspective view of a fluid dispensing system in accordance with the present invention;

FIG. 3 is a sectional view taken along the line 3—3 of FIG. 1, with the inlet valve and pumping piston depicted in a longitudinally split manner to indicate the fully extended and fully retracted positions thereof;

FIG. 6 is an essentially schematic depiction of a pump system in accordance with the present invention having a hydraulically acutated height adjustment mechanism;

FIG. 7 is a perspective view of an alternative embodiment of the present invention incorporating a plurality of dispensing nozzles in conjunction with a single manifold;

DETAILED DESCRIPTION OF THE DRAWINGS

Figure 4:
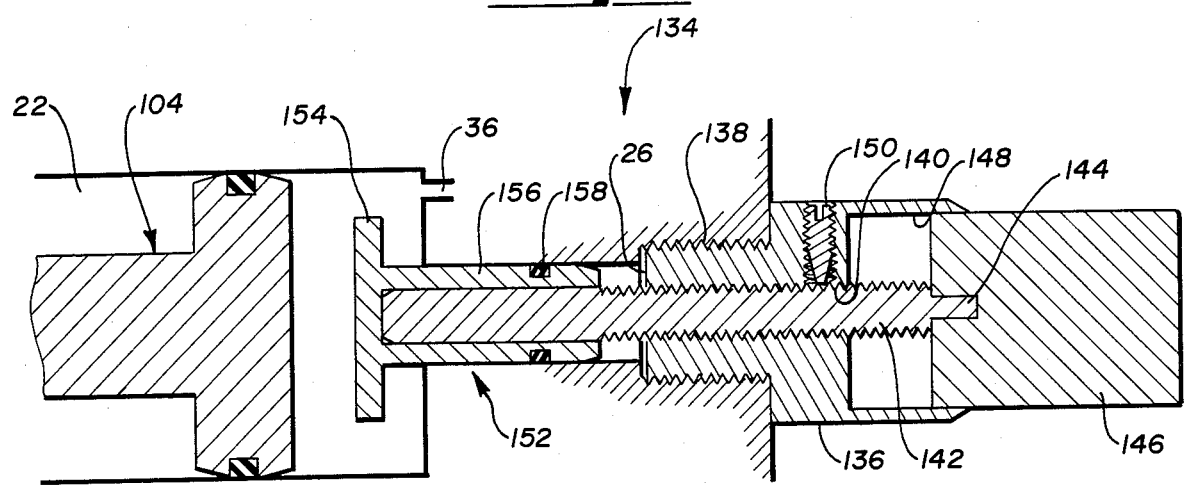
FIG. 4 is a sectional view of a calibration mechanism for a fluid dispensing system in accordance with the present application.

Referring to the drawings, a fluid dispensing system 10 in accordance with the present invention includes an air manifold 12 and detachable pump head 14. As depicted in FIG. 1, the system 10 may advantageously be adjustably mounted on a vertically oriented support stand 16.

Figure 5:
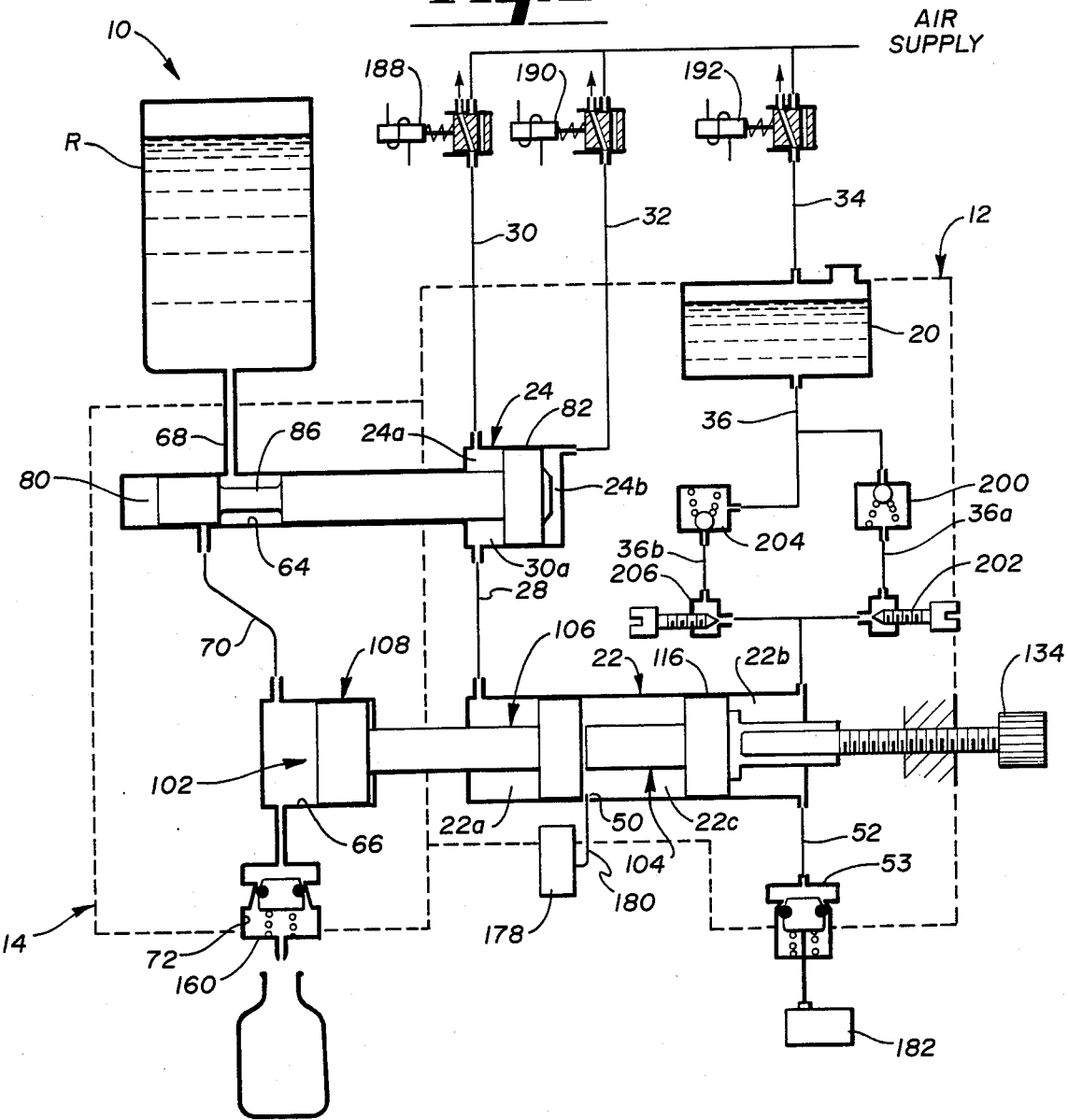
FIG. 5 is a schematic depiction of the fluid dispensing system in accordance with the present invention.

The manifold 12 broadly includes a casing 18 preferably formed from an easily fabricated material compatible with air and hydraulic fluid. The casing 18 includes three major cavities. The first cavity 20 comprises a hydraulic fluid reservoir. The second and third cavities 22, 24 comprise piston receiving cylinders. A partially threaded channel 26 communicates with and extends rearwardly of cavity 22. The casing 18 further includes bored through, air conducting conduits 28, 30, 32 and 34, and hydraulic fluid conducting conduit 36. Referring to FIG. 5, it will be understood that conduit 36 includes supply line 36a and return line 36b, although only supply line 36a is depicted in the sectional view of FIG. 3. Threaded, supply-air channels 38, 40 are bored through one side wall of casing 18. Each side wall of casing 18 includes side by side threaded channels 42, 44, although, again, only one set of channels 42, 44 is depicted in FIG. 3. The two sets of channels 42, 44 communicate with supply line 36a and return line 36b of fluid conduit 36 respectively. Upper and lower, rod-receiving, bored channels 46, 48 extend along the longitudinal length of the casing 18. Finally, vent port 50 extends downwardly from the casing 18, and a pressure communicating channel 52 extends from cylinder 22 to a sensor receiving receptacle 53, as depicted schematically in FIG. 5.

Pump head 14 includes casing 54, fabricated from a material such as stainless steel or Teflon, that is compatible with the solution to be pumped. Head casing 54 includes threaded, rod receiving channels 56, 58. Threaded rods 60, 62 are received through body casing channels 46, 48 and head channels 56, 58, detachably coupling the pump head 14 to the manifold 12.

Head casing 54 includes inlet valve receiving cavity 64 and pump piston receiving cavity 66. As seen in FIG. 3, head cavities 64, 66 are aligned with manifold cavities 24, 22 respectively when the pump head 14 is coupled to the manifold 12. Inlet channel 68 extends from the top wall of the head casing 54 to the inlet valve receiving cavity 64. Internal channel 70 communicates the inlet valve receiving cavity with the pump piston receiving cavity 66. A threaded, nozzle receptacle 72 extends downwardly from pump piston receiving cavity 66 through to the bottom wall of the head casing 54. Finally, a heating element receptacle 74 is provided on either side of the rear wall of head casing 54, as is a thermistor receiving channel 76.

A cylindrical, elongated, spool type inlet valve 80 is received within inlet valve receiving cavity 64 of the pump head 14, and extends into the inlet valve cylinder 24 of casing 18. The inlet valve 80 is depicted in split configuration in FIG. 3, with split portion 80a depicting the valve in its fully extended position, and split portion 80b depicting the valve in its fully retracted position. The foot of valve 80 comprises a cylindrical flange 82 having a diameter just less than the diameter of inlet valve cylinder 24. The flange 82 divides the cylinder 24 into a first chamber 24a in communication with air conduit 30, and a second chamber 24b in communication with air conduit 32. The diameter of the main body portion 84 of inlet valve 80 is smaller than that of the valve flange 82, and is just smaller than the diameter of inlet valve receiving cavity 64 of the pump head 14. The spool portion 86 of the inlet valve 80 is of substantially reduced diameter as compared to the diameter of the main body portion 84. A plurality of O-ring seals 88 circumferentially span the inlet valve 80 providing a fluid tight seal between the inlet valve 80 and the side walls of cavity 64 and cylinder 24. A generally tubular sleeve 90 receives the inlet valve main body portion 84. One end 92 of sleeve 90 abuts against the pump head casing 54. The opposed end 94 of the sleeve 90 includes a circumferentially extending flange 96 that abuts against the casing 18. O-ring seals 98, 100 provide fluid tight seals between the sleeve 94 and the inlet valve body 84 and inlet valve cylinder side wall respectively. Referring to FIG. 3, it will be observed that when the inlet valve 80 is in the fully extended position the spool portion 86 of the inlet valve provides communication between inlet channel 68 and internal channel 70 of the pump head 14. When the inlet valve 80 is in its fully retracted position, the leading end of valve main body portion 84 effectively isolates inlet channel 68 from internal channel 70.

A sectionalized pump piston 102 is shiftably received within pump head cavity 66 and cylinder 22. Referring to FIG. 3, it will be observed that, similar to the inlet valve 80, the piston 102 is depicted in split configuration with portion 102a representing the piston in its fully extended position and split portion 102b depicting the piston in its fully retracted position.

Piston 102 comprises first and second ram portions 104, 106, and piston head 108. The piston head 108 is threadably received on support rod 112 of the second ram portion 104. Piston ram portions 104, 106 each include radially outwardly extending flanges 114, 116 having diameters just smaller than the diameter of piston cylinder 22 of the casing 18. Flanges 114 and 116 divide the cylinder 22 into a first chamber 22a in communication with air conduit 28, a second chamber 22b in communication with hydraulic fluid conduit 36, and an intermediate chamber 22c in communication with vent 50. O-rings 118, 120 provide fluid tight seals between the flanges 114, 116 and the cylinder side wall. Piston ram portion 116 is shiftably received within a support sleeve 122. One end 124 of sleeve 122 abutably engages the rear wall of pump wall casing 54. The opposed end 126 of the piston support sleeve 122 includes a stepped portion that abutably engages the front wall of casing 18. O-ring seals 128, 130 provide fluid tight seals between the sleeve 122, and the ram portion 116 and piston cylinder side wall respectively.

The outer diameter of piston head 108 is just smaller than the diameter of piston receiving cavity 66. O-ring 132 provides a fluid tight seal between the piston head 108 and the side wall of cavity 66. It will be appreciated, that, since the piston head 108 is threadably received on support rod 112, the head 108 may be easily replaced by a head of smaller or larger diameter should it be desired to provide a pump head 14 having a pump piston receiving cavity 66 of different diameter, and hence different pumping capacity, than that depicted in the drawings.

Referring in particular to FIG. 4, it will be seen that calibration mechanism 134 is threadably received within channel 26. The calibration mechanism 134 includes an outer sleeve 136. Sleeve 136 is externally threaded at one end 138 thereof for threadable mating with the outer portion of channel 26. Sleeve 136 also includes a threaded bore 140 which receives threaded calibration rod 142. Calibration rod 142 has a flattened outer end 144 that is fixedly coupled to vernier knob 146. Knob 146 is shiftably received within cavity 148 of sleeve 136. A preferably nylon or Teflon set screw 150 is received through sleeve 136 for selective locking abutment against calibration rod 142. Calibration rod 142 extends internally within the cavity 26, and is received within shiftable end fitting 152. End fitting 152 includes a flared head 154 for abutable engagement with piston ram portion 104, and a generally cylindrical body 156 shiftably received within cavity 26. O-ring seal 158 provides a fluid type seal between the end fitting 152 and the side wall of cavity 26.

Dispensing nozzle 160 is threadably received within receptacle 72. The dispensing nozzle 160 includes nozzle head 162, poppet 164, retainer 166, dispensing tube 168, poppet biasing spring 170, and O-ring seals 172, 174, 176.

End of stroke sensing switch 178 is attached to the bottom wall of the casing 18. The switch 178 comprises a conventional microswitch, incorporating an activating lever 180 that extends through vent channel 50 for actuating abutment with flange 114 of piston ram portion 104.

Pressure sensing switch 182 is received within sensing receiving receptacle 53, as is schematically depicted in FIG. 5. The receptacle 53 is in pressure communication with cylinder chamber 22b.

Reservoir cavity 20 is sealed by threaded plug 184. O-ring seal 186 provides a fluid tight seal between the plug 184 and casing 18.

A plurality of electrically actuated, pneumatic single pole double throw switches 188, 190, 192 are attached to the top wall of the casing 18 by screws 194, 196, 198. Air switch 188 is in communication with air conduit 30, switch 190 is in communication with air conduit 32, and switch 192 is in communication with air conduit 34.

A check valve 200, and a needle valve 202 are respectively threadably received within threaded channels 42, 44 of one side wall of casting 18. Although only one set of check valves 200 and needle valve 202 are depicted in FIGS. 2 and 3, it is to be understood that a second set of check and needle valves 204, 206 are included in the opposed side wall of pump casing 18, as is schematically depicted in FIG. 5 by numerals 204, 206. One set of check and needle valves is in communication with the supply line 36a, and the other set is in communication with return line 36b.

Hose coupling 208 is received within inlet channel 68 of the pump heading casing 54. Heating elements 209 and thermistor 211 are received within channels 74, 76 respectively.

Referring to FIG. 1, it will be seen that the manifold and head may be advantageously attached to support stand 16 via coupling 210. Coupling 210 includes a shiftable slide 212, and a bracket 214 detachably connected to slide 212 by knob 216. The bracket 214 is fixedly connected to one side wall of the casing 18. The slide 212 is shiftably carried by vertically oriented track 218 of stand 16. Horizontally oriented arm 220 is connected to and extends generally perpendicularly from slide 212, and is received on adjustable guide 222. Guide 222 comprises a lower most stanchion 224 which supports threaded adjustment knob 226. The vertical height of the slide 212, and thereby the vertical height of the pump heading casing, may be controlled by turning the knob 226 such that the arm 220 is threadably raised and lowered along the threaded rod of knob 226. The track 218 is supported by gusset 228. The gusset 228 and stanchion 224 are supported by base plate 230.

Referring to FIG. 6, an alternative means for supporting the pump head and casing is depicted in basically schematic form. The pump casing 18' is depicted as being supported by two fixed piston rods 232, 234 mounted on base plate 236. Piston heads 238, 240 of piston rods 232, 234, are received within piston cylinders 242, 244 of casing 18'. The lower portions of each piston cylinder 242, 244 are connected, through valve 188' and conduit 246 to a source of high pressure air. The upper portions of the cylinders 242, 244 are connected to a reservoir 248 of hydraulic fluid by conduit 250. Conduit 250 includes supply line 252 and return line 254. Supply line 252 includes check valve 256 and needle valve 258, and the return line 254 includes check valve 260 and needle valve 262. A fourth, electronically actuated, pneumatic, single pole double throw switch 264, depicted in schematic form, selectively connects the hydraulic fluid reservoir 248 to a source of pressurized air.

Figure 8:
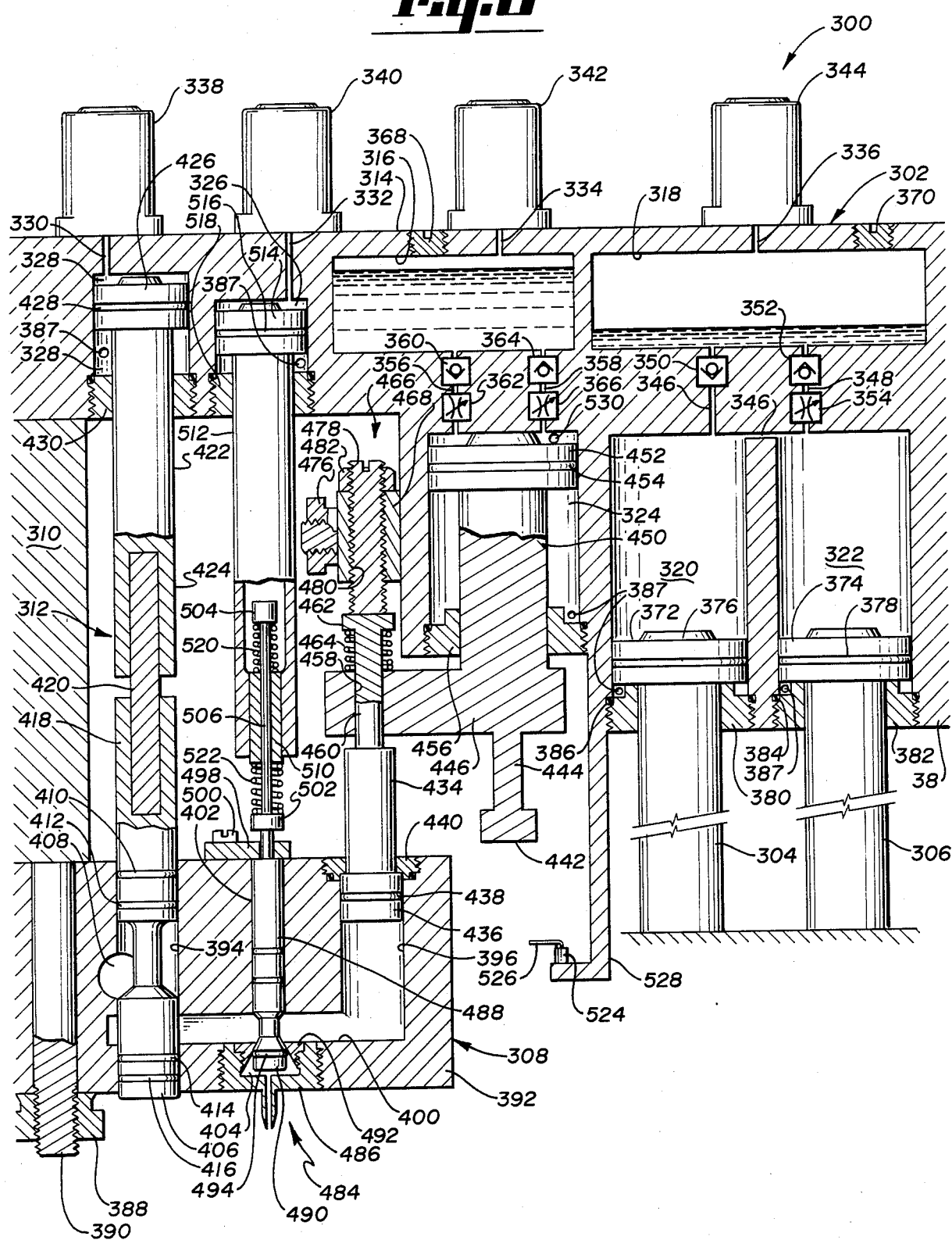
FIG. 8 is a longitudinal sectional view of the pump system depicted in FIG. 7.

Referring to FIGS. 7 and 8, a second embodiment of the present invention that incorporates multiple dispensing nozzles in conjunction with a single air manifold will now be described.

A pump dispensing system 300 in accordance with the second embodiment of the invention broadly includes a manifold 302 carried by support rods 304, 306, a pump head 308 connected to the manifold 302 by support bar 310, and valving mechanism 312 interposed between the manifold 302 and pump head 308.

Manifold 302 comprises a casing 314 formed from a material compatible with pressurized air and hydraulic fluid. The casing 314 includes first and second hydraulic reservoirs 316, 318, support rod receiving cylinders 320, 322, pump actuating cylinder 324, nozzle actuating cylinder 326, and inlet valve cylinder 328. Air directing conduits 330, 332, 334, 336 direct pressurized air from electronically controlled, pneumatic single pole, double throw switches 338, 340, 342, 344 to air cylinders 328, 326 and reservoirs 316, 318 respectively. Cylinders 320, 322 are interconnected by channel 346, and are connected to reservoir 318 via hydraulic fluid carrying conduits 346, 348. Return conduit 346 includes check valve 350, and supply conduit 348 includes check valve 352 and needle valve 354. The reservoir 316 is connected to cylinder 324 via return conduit 356, and supply conduit 358. Return conduit 356 includes check valve 360 and needle valve 362, and supply conduit 358 includes check valve 364 and needle valve 366. Threaded fill plugs 368, 370 seal reservoirs 316, 318.

Support rods 304, 306 include piston heads 372, 374 respectively received within cylinders 320, 322. The piston heads 372, 374 include sealing rings 376, 378 respectively. The piston heads 372, 374 are retained within cylinders 320, 322 via threaded collars 380, 382. O-ring seals 384, 386 provide a fluid tight seal between the collars 380, 382 and the casing 314. The lower ends of cylinders 324, 328, 326, 320, 322, 324 are supplied with pressurized air via a common conduit 387.

Pump head 308 is detachably coupled to support bar 310 by attachment nut 388 threadably received on rod 390 of support bar 310. The pump head 308 comprises a casing 392 formed from a material compatible with the solution to be pumped. The pump head casing 392 includes inlet valve channel 394, piston cylinder 396, conduit 400 interconnecting the inlet channel 394 and piston cylinder 396, and nozzle poppet receiving channel 402. The pump head casing 392 further includes a nozzle receptacle 404.

A spool type inlet valve 406 is received within the inlet channel 394. The inlet channel 394 includes an inlet conduit 408 that is isolated from the interconnecting conduit 400 when the spool inlet valve 406 is in the retracted position as shown in FIG. 8, and which is in communication with the interconnecting channel 400 when the spool inlet valve 406 is in its extended position. O-rings 410, 412, 414, 416 provide fluid tight seals between inlet spool valve 406 and the side walls of the inlet channel 394.

The spool valve extends outwardly and upwardly beyond the inlet channel 394 and terminates in a clevis end 418 that is fastened to cross bar 420. Referring in particular to FIG. 7, it will be seen that a plurality of inlet valves 406 with clevis ends 418 may be attached to a single bar 420.

A single, inlet-valve-acuating piston rod 422 includes a clevis end 424 that is also attached to the upper marginal end of cross bar 420. An upper piston head 426 including piston ring 428 is carried by the rod 422, and is received within inlet valve actuating cylinder 328 of casing 314. The piston head 426 is retained within the cylinder 328 by threaded collar 430.

Pump piston 434 is received within pump cylinder 396 of manifold 308. The piston 434 includes piston head 436 which carries piston ring 438. The piston head 436 is retained within cylinder 396 by threaded collar 440.

PumP-piston-actuating cross bar 442 is shiftably carried by casing 314. The cross bar 442 includes a transverse cross beam 444. A plurality of horizontally oriented arms 446 project outwardly from the cross beam 444. A single piston rod 450 extends upwardly from the cross beam 444. The piston rod 450 carries a piston head 452 which is received within pump actuating cylinder 324 of casing 314. The piston head 452 includes piston ring 454, and is retained within cylinder 324 by threaded collar 456. Each arm 446 of cross bar 442 includes a vertically oriented channel within which is received the narrowed upper portion 460 of respective pump pistons 434. The upper piston portions 460 include an uppermost, radially extending retaining flange 462. A biasing spring 464 is interposed between the retaining flange 462 and each arm 446.

Calibration mechanism 466 is removably attached to the casing 314. The calibration mechanism includes a transversely extending plate 468 that is carried by threaded post 470, 472 integrally formed with the manifold casing. Retaining nuts 474, 476 rigidly couple the plate 468 to the casing 314. Calibration screws 478 are received through individual threaded channels 480 within calibration plate 468. The calibration screws 478 abutably engage the retaining flange 462 of respective poppet pistons 434. Lock nuts 472 selectively restrict movement of calibration screws 478.

The second embodiment of the dispensing pump system 300 in accordance with the present invention includes a positively activated nozzle 484, as opposed to the spring biased nozzle discussed in conjunction with the first embodiment. It will be understood, however, that either a spring biased or positively actuated nozzle could be incorporated into either of the two embodiments.

The nozzle 484 includes spout 486 threadably received within the pump casing, and nozzle poppet rod 488. Poppet rod 488 includes head 490 retained within receptacle 404 by retainer 492. A seal 494 is carried by the poppet rod head 490. The poppet rod 488 is shiftably received within poppet channel 402, and is retained within the channel by retaining plate 498. The retaining plate 498 is secured to the top wall of pump head 308 by screws 500. Poppet rod 488 includes spring retainers 502, 504, carried on upper rod portion 506.

Each poppet rod upper portion 506 is received within respective channels in cross beam 510. The beam 510 is supported by a single actuating piston 512. The piston 512 includes piston head 514 shiftably received within cylinder 326. The piston head 514 includes piston ring 516, and is retained within the cylinder 326 by threaded collar 518. Relatively stiff cushioning springs 520, 522 are interposed between the cross beam 510 and retainers 502, 504.

A limit sensing microswitch 524 with activating lever 526 is positioned on support 528. A pressure sensing switch 530 is in communication with the upper portion of cylinder 324.

Operation of the fluid dispensing system in accordance with the first embodiment will now be described, referring primarily to FIG. 5.

The dispensing system is made ready by energizing air switch 188 from the normally open, to the closed position. The switch 188 remains closed the entire time the system is energized, providing pressurized air to valve cylinder chamber 24a and piston cylinder chamber 22a. The pressurization of chambers 24a and 22c acts as a biasing force to urge the inlet valve 80 and piston 106 to their retracted positions. In this regard, it wil be noticed that the reactive surface areas of both valve 80 and piston 106 exposed to chambers 24a and 22a respectively is less than the reactive areas presented to chambers 24b and 22c. Pressurization of chambers 24b and 22c during the pump cycle to an equivalent pressure as chambers 24a and 22a will therefore overcome the biasing forces exerted within chambers 22a and 24a.

Once the system has been initialized by providing pressurized air to chambers 24a and 22a to shift valve 80 and piston 106 to their retracted positions, the pump cycle is initiated by closing of the air switch 192, thus directing pressurized air to the hydraulic fluid reservoir 20. The source of pressurized air through each air switch may be the standard work bench or laboratory air of about 100 pounds per square inch. Pressurization of the reservoir 20 will cause hydraulic fluid to flow through the supply line 36a of fluid conduit 36, into the cylinder chamber 22b. Introduction of hydraulic fluid into the chamber 22b will overcome the biasing force exerted within chamber 22a and urge the piston 102 leftwardly, as depicted in FIG. 5, to its extended position. The pump piston 102 will travel leftwardly until the piston head portion 108 abutably contacts the far side wall of the piston receiving cavity 66 within the pump head 14.

As the piston head portion 108 contacts the side wall of the piston receiving cavity 66, the flange 114 of the ram portion 104 will contact the lever 180 of end of stroke sense switch 178. The end of stroke sense switch 178 will then send a signal to the pneumatic air switches 190, 192, shifting switch 190 to the supply position, and shifting the switch 192 to the exhaust position. The reservoir 20 will therefore become depressurized, and, at the same time, pressurization of chamber 24b will shift the inlet valve 106 to the extended, open position.

It will be remembered that piston chamber 22a remains pressurized at all times. The pump piston 102 will therefore be shifted rightwardly to its retracted position, as the inlet valve is shifted leftwardly to its open position. Keep in mind that, since the reservoir 20 will be depressurized as the inlet valve 106 shifts open, the hydraulic fluid within the pump piston chamber 22b may exhaust through return line 36b into the reservoir 20. Since the inlet valve 80 is in its open position as the pump piston 102 is shifted to the retracted position, a positive suction will be created drawing fluid to be dispensed from the dispensed fluid reservoir R into the pump head cavity 66.

It is to be understood that the needle valves 202, 206 in the supply and return lines 36a and 36b respectively, enable the pump operator to control the rate of flow of the hydraulic fluid through the conduit 36. In this manner, positive control of the rate of pumping can be effected. The use of hydraulic fluid, as opposed to compressed air, for instance, allows for precise control of the rate of fluid through the conduit.

As the pump piston is shifted rightwardly to its retracted position in the manner described above, the hydraulic fluid within the piston cylinder chamber 22a will be pressurized. Pressure sensing switch 182 is responsive to the increase in pressure. Once the piston has shifted to its fully retracted position, and the flange 116 of piston ram portion 106 abuts against end fitting 152 of the calibration mechanism 34, the overpressurization of the fluid within the cylinder chamber 22b will diminish as fluid bleeds through return line 36b to reservoir 20. The pressure sensing switch 182 will send an electrical signal to pneumatic switch 190, when the pressure reaches about atmospheric pressure, causing switch 190 to shift to the exhaust position. Chamber 24b will therefore be vented to the atmosphere, and piston 106 will shift rightwardly to the closed position, due to the biasing force presented by pressurized chamber 24a.

The above described cycle may be repeated by again actuating switch 192, and pressurizing the reservoir 20. The pumping system may advantageously be used in conjunction with an assembly line such that consecutive receptacles are placed into alignment with the dispensing nozzle 160 with a pump stroke initiated when each successive receptacle is aligned with the nozzle.

Referring to FIG. 6, operation of the elevating feature of the fluid dispensing system 10' in accordance with the present invention will now be described.

The cycling of the inlet valve and pump piston of the embodiment of the invention depicted in FIG. 6 is identical to that described above. It will noted, however, that when the system is energized by activating air switch 188' pressurized biasing air is directed to the lower portion of piston cylinders 242, 244. When switch 264 is in its normally open position, therefore, the manifold and head of pump system 10' are shifted to a lowered position. Switch 264 is shifted to the closed, supply position when fluid is actually being dispensed from the pump head 14'. The pump head 14' is thereby gradually raised, since reservoir 248 will be pressurized, forcing hydraulic fluid through line 252 and into cylinders 242 and 244. The rate at which the pressurized fluid is introduced to the cylinders 242, 244 may be controlled by needle valve 258. As fluid is dispensed from the pump head 14', therefore, the pump head 14' in conjunction with the casing 18' will be shifted upwardly. Splashing of dispensed fluid within the receptacle is thereby reduced to a minimum, since the dispensing nozzle may be continuously oriented just over the surface of the dispensed fluid within the receptacle receiving the dispensed fluid. Once the dispensing cycle is completed, the switch 264 may be shifted to the open position, preferably on signal from a stroke limiting sensing switch (not shown). Reservoir 248 is thereby allowed to exhaust to the atmosphere, and hydraulic fluid may exit the cylinders 242, 244 by a return line 254 of conduit 250 as the casing 18' is lowered under the biasing pressurized air provided by line 246 to cylinders 238, 240. The rate at which fluid flows through the return line 254 may be controlled by adjustable needle valve 262.

Operation of calibration mechanism 134 will not be described. Referring to FIG. 4, it will be observed that the sleeve 136 of calibration mechanism 134 is positively positioned within the casing 18, whenever the mechanism is screwed into the body casing. The calibration mechanism 134 may therefore be set to desired settings, by adjustment of vernier knob 146, with the associated shifting of calibration rod 142, in a single operation that sets the position of rod 142 within sleeve 136. Once the calibration rod 142, is in the appropriate setting, screw lock 150 may be tightened down upon calibration rod 142 thereby locking the rod 142 in position within the sleeve 136. The position of end fitting 152 is thereby set, by rod 142, within the pump cavity 22 whenever the calibration mechanism is threadably fitted into the casing 18. Moreover, a second calibration mechanism 134 with the calibration rod 142 set at a different position within the respective sleeve 136 may be quickly substituted for the original calibration mechanism, thereby shifting end fitting 152 to a different position within cavity 22. The length of stroke of the pump piston 102, and accordingly, the amount of fluid dispensed in each stroke of the pump piston 102, may thereby be easily controlled and changed. Moreover, it will be appreciated that the pump head 14 may be removed from the manifold, and the inlet valve and pump piston removed for maintenance, without affecting the setting of the calibration mechanism.

Operation of the second embodiment of a fluid dispensing system 300 in accordance with the present invention will now be made with reference to FIGS. 7 and 8. It will be understood that the operation of the second embodiment is, in its essential aspects, similar to the operation described for the first embodiment; the difference being the adaptation for driving a plurality of dispensing nozzles in a single pumping system.

The dispensing system 300 is made ready for operation by connecting a source of high pressure air to the common conduit 387 supplied to manifold chambers 320, 322, 324, 326, and 328. The pressurized air is supplied to the lower portion of each cylinder chamber, and acts as a biasing force to urge respective piston heads 372, 374, 452, 514, 426 upwardly within their receiving cylinders.

Air switches 338, 340, 342, 344 will be in their exhaust positions as the system 300 is being initialized. Manifold 302 will therefore be shifted, by the biasing force of pressurized air within cylinder chambers 320, 522 to its lowered position. Inlet valve 406 is biased upwardly to its closed position, as is nozzle poppet rod 488. Piston rod 450 is likewise biased to its fully retracted position, shifting the pump piston 434 upwardly within chamber 396 of the pump head 308.

The pump cycle is initiated by actuating air switch 340 and 342, shifting them to the supply position. Pressurized air is thereby supplied through conduit 332 to cylinder 326. It will be observed that the reacting surface of piston head 514 exposed to the pressurized air entering through conduit 332 is significantly larger than the reactive surface presented by the head 514 to the biasing pressurized air introduced to cylinder 326 via conduit 387. The piston head 514 is thereby urged downwardly as is the piston rod 512 and the attached cross beam 510. Springs 520, 522 carried on rod 506 are relatively stiff, and downward motion of the cross beam 510 will therefore force the poppet rod 488 with integral nozzle head 486 downwardly, to the open position. At the same time that the dispensing nozzle is open, reservoir 316 is pressurized by the introduction of pressurized air to the reservoir via switch 342. Hydraulic fluid within the reservoir 316 is thereby pressurized and delivered to cylinder chamber 324 via conduit 358. The piston head 452 is thereby forced downwardly against the biasing force of the pressurized air introduced within cylinder 324 via conduit 387. Downward movement of piston 450 is communicated via arms 446 to respective pump pistons 434. In this regard, it will be appreciated, that any number of nozzle poppet rods 488, pump pistons 434 and inlet valves 406 may be attached to the cross beams 510 and 442 respectively, thus controlling the dispensation of fluid from any number of nozzles.

Piston 434 will travel downwardly within pump head cylinder chamber 396 until the piston head 436 abuts against the far side wall of the cylinder 396. About the same time that the cylinder head 436 abuts against the far side wall, the cross beam 446 will abut against the actuating lever of end of stroke limiting switch 526. Actuation of the limiting switch 526 will send s signal to air switches 558, 340, and 542. Air switches 340 and 342 will be shifted to their exhaust positions, venting pressure from the cylinder 326 via conduit 332, and from reservoir 316 via conduit 334. Pistons 512 and 450 will thereby be shifted upwardly within their respective cylinders under the biasing influence of pressurized air introduced to the cylinders by conduit 387. It will be understood that the rate at which piston 450 is either extended or retracted may be controlled by adjusting needle valve 366, and 362 respectively.

Pressure switch 530 within piston cylinder 324 will detect an overpressurization of hydraulic fluid within the cylinder 324 until such time as the piston head 452 abutably engages the top wall of the cylinder. At that time the sensing switch 530 will initiate a signal transmitted to the air switch 558, shifting the switch to the exhaust position, and introducing pressurized air thereby venting the upper portion of cylinder 328 via conduit 330. The inlet valve 406 will thereby be shifted upwardly, to its closed position, due to the biasing force of pressurized air introduced into the lower portion of cylinder 328 via conduit 387. It will be appreciated that, since the inlet valve 406 is shifted downwardly to its open position while the piston 450, and therefore attached pump piston 434 are shifted upwardly, a suction will be communicated through inlet 408 to a source of fluid to be dispensed, causing the fluid to flow into pump cylinders 396.

The above described cycle may again be initiated by shifting the air switches 340, 342, on command, to the supply position.

The manifold 302, and attached pump head 308, may be raised on support rods 304, 306, by shifting air switch 334 to the air position, thus introducing pressurized air into reservoir 318. Upon pressurization of the reservoir 318, hydraulic fluid is introduced into cylinders 320, 322 via conduit 348, thus shifting piston head 372, 374 relatively downwardly and lifting the manifold 302. The rate at which fluid is introduced into cylinder 320, 322 may be controlled by needle valve 354. The pressurization of reservoir 318, and the subsequent lifting of the manifold 302, may be coordinated with the dispensing cycle of the pump such that the manifold 302 and pump head 308 are raised at the same time fluid is being dispensed through the nozzle. Splashing of dispensed fluid is thereby kept to a minimum. The manifold 302 may be lowered by shifting air switch 344 to the exhaust position, venting reservoir 302 and allowing the biasing force of pressurized air within the lower portion of cylinders 320, 322 to lift piston heads 372, 574 relatively upwardly within the cylinders.

The calibration mechanism 466 may be removed and replaced by a second calibration mechanism with calibration screws 478 set to alternative position. The length of the upward stroke of the pump piston 434 may thereby be controlled, and the volume of fluid dispensed on each cycle is easily changed.

I claim:

1. A dispensing system for pumping fluid in metered quantities comprising:
    a manifold defining a first circular in cross section cavity having a first cavity diameter and a second cavity;
    a pump head including third and fourth cavities alignable with said first and second cavities to define first and second cylinders;
    an inlet valve carried within said first cylinder and shiftable between open and closed positions, said inlet valve including a circular in cross section first cavity insertion portion received within said first cavity, said first cavity insertion portion having a largest diameter no larger than said first cavity diameter whereby said inlet valve is slidably removable from said first cavity;
    piston means carried within said second cylinder and shiftable between extended and retracted positions;
    means for operably, detachably coupling said pump head and said manifold casing whereby said pump head can be easily separated from said manifold to expose said inlet valve and said piston means;
    means operably coupled with said inlet valve for selectively shifting said inlet valve between said open and closed positions;
    means operably coupled with said piston means for selectively shifting said piston means between said extended and retracted positions;
    inlet means operably coupled to said third cavity adapted for coupling said third cavity to a source of said fluid to be dispensed;
    nozzle means operably coupled to said fourth cavity for selectively dispensing fluid from said fourth cavity;
    conduit means operably coupling said third and fourth cavities for fluid communication therebetween; and
    control means for synchronizing the operation of said inlet valve shifting means and said piston shifting means such that said inlet valve is positioned in said open positions when said piston is shifted to said retracted position, and said inlet valve is positioned in said closed position when said piston is shifted to said extended Position, whereby said fluid is drawn through said inlet means into said fourth cavity when said piston means is shifted to said retracted position, and said fluid is expelled from said fourth cavity through said nozzle means when said piston means is shifted to said extended position,
    said inlet valve and said piston means effectively sealing said third and fourth cavities from said first and second cavities in fluid tight relationship such that said inlet valve shifting means and said piston shifting means are isolated from said dispensed fluid,
    said pump head including a detachable first cylinder spacer sleeve, said first cylinder spacer sleeve including structure defining an internal bore comprising a portion of said third cavity, an abutment surface for positionable abutment of said pump head with said manifold, and an abutment shoulder portion slidably received within said first cavity, said inlet valve insertion portion including a stroke limiting member abutable against said sleeve abutment shoulder portion, whereby the stroke of said inlet valve is contained by said first cylinder spacer sleeve when said dispensing system is fully assembled, and said inlet valve insertion portion is slidably removable from said third cavity when said pump head is separated from said manifold.

2. A dispensing system as claimed in claim 1, said pump head including a detachable second cylinder spacer sleeve including structure defining an internal bore comprising a portion of said fourth cavity, an abutment surface for positionable abutment of said pump head with said manifold, and an abutment shoulder portion slidably receivable within said second cavity, said piston means second cavity insertion portion including a stroke limiting member abutable against said sleeve aubtment shoulder portion, whereby the stroke of said piston means is contained by said second cylinder spacer sleeve when said dispensing system is fully assembled, and said piston means insertion portion is slidably removable from said fourth cavity when said pump head is separated from said manifold.

3. A dispensing system for pumping fluid in metered quantities, comprising:
    a manifold including structure defining an inlet valve retaining cavity having a valve retaining cavity diameter;

an inlet valve for regulating the flow of said fluid into said dispensing system, said inlet valve shiftably carried within said manifold and including a valve insertion portion received within said inlet valve retaining cavity, said valve insertion portion having a largest diameter no larger than said inlet valve retaining cavity diameter whereby said inlet valve is slidably removable from said inlet valve retaining cavity, said inlet valve further including a fluid contacting surface extendable outside of said manifold;

a fluid pumping piston for transferring said fluid through said dispensing system, said piston carried within said manifold and including a fluid contacing surface extendable outside of said manifold;

a pump head including structure defining an inlet valve receiving cavity and a fluid pumping piston receiving cavity, said inlet valve receiving cavity and said piston receiving cavity mutually, respectively alignable with said inlet valve and said piston for respectively receiving said inlet valve fluid contacting surface and said piston fluid contacting surface therein; and means for operably, detachably coupling said pump head and said manifold whereby said pump head can be easily separated from said manifold to expose said inlet valve fluid contacting surface and said piston fluid contacting surface, and thereby provide cleaning and maintenance access to said pump head and said piston fluid contacting surface and said inlet valve fluid contacting surface, said pump head including a detachable inlet valve receiving cavity spacer sleeve, said inlet valve receiving cavity spacer sleeve including structure defining an internal bore comprising a portion of said inlet valve receiving cavity, an abutment surface for positionable abutment of said pump head with said manifold, and an abutment shoulder portion slidably receivable within said inlet valve retaining cavity, said inlet valve insertion portion including a stroke limiting member abutable against said sleeve abutment shoulder portion, whereby the stroke of said inlet valve is contained by said inlet valve receiving cavity spacer sleeve when said dispensing system is fully assembled, and said inlet valve insertion portion is slidably removable from said inlet valve retaining cavity when said pump head is separated from said manifold.

4. A dispensing system as claimed in claim 3, said pump head including a detachable piston receiving cavity spacer sleeve, said piston receiving cavity spacer sleeve including structure defining an internal bore comprising a portion of said piston receiving cavity, an abutment surface for positionable abutment of said pump head with said manifold, and an abutment shoulder portion slidably receivable within said piston retaining cavity, said piston insertion portion including a stroke limiting member abutable against said sleeve abutment shoulder portion, whereby the stroke of said piston is contained by said piston receiving cavity space sleeve when said dispensing system is fully assembled, and said piston insertion portion is slidably removable from said piston retaining cavity when said pumpp head is separated from said manifold.

* * * * *

UNITED STATES PATENT AND TRADEMARK OFFICE
CERTIFICATE OF CORRECTION

PATENT NO. : 4,610,377

DATED : September 9, 1986

INVENTOR(S) : Robert Rasmussen

It is certified that error appears in the above-identified patent and that said Letters Patent is hereby corrected as shown below:

In column 9, line 6, the word "be" should be inserted after the word "will".

In column 10, line 56, delete the word "s" and insert the word "a".

In column 6, line 55, delete the word "PumP-piston-actuating" and insert --Pump-piston-actuating--.

In column 7, line 12, delete the number "472" and insert --482--.

In column 8, line 52, delete the number "34" and insert --134--.

In column 9, line 36, delete the word "not" and insert --now--.

In column 12, line 22, delete the word "Position," and insert --position,--.

UNITED STATES PATENT AND TRADEMARK OFFICE
CERTIFICATE OF CORRECTION

PATENT NO. : 4,610,377

DATED : September 9, 1986

INVENTOR(S) : Robert Rasmussen

It is certified that error appears in the above-identified patent and that said Letters Patent is hereby corrected as shown below:

> In column 14, line 31, delete the word "pumpp" and insert --pump--.

Signed and Sealed this

Thirteenth Day of January, 1987

*Attest:*

DONALD J. QUIGG

*Attesting Officer*     *Commissioner of Patents and Trademarks*